(12) United States Patent
Miyata et al.

(10) Patent No.: US 12,361,976 B2
(45) Date of Patent: Jul. 15, 2025

(54) BASE PLATE WITH METAL MEMBER EMBEDDED IN THE PERIPHERAL WALL PART, MOTOR, AND DISK DRIVING DEVICE HAVING THE SAME

(71) Applicant: NIDEC CORPORATION, Kyoto (JP)

(72) Inventors: Koutarou Miyata, Kyoto (JP); Michihiro Ito, Kyoto (JP); Takashi Mitsunari, Kyoto (JP); Ryo Furuya, Kyoto (JP); Kenta Miyoshi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 18/462,413

(22) Filed: Sep. 7, 2023

(65) Prior Publication Data
US 2024/0087615 A1 Mar. 14, 2024

(30) Foreign Application Priority Data

Sep. 9, 2022 (JP) .................. 2022-143764

(51) Int. Cl.
| | |
|---|---|
| *G11B 33/02* | (2006.01) |
| *G11B 25/04* | (2006.01) |
| *G11B 33/12* | (2006.01) |
| *H02K 5/06* | (2006.01) |
| *H02K 15/14* | (2025.01) |

(52) U.S. Cl.
CPC .......... *G11B 33/022* (2013.01); *G11B 25/043* (2013.01); *G11B 33/121* (2013.01); *G11B 33/124* (2013.01); *H02K 5/06* (2013.01); *H02K 15/14* (2013.01)

(58) Field of Classification Search
None
See application file for complete search history.

(56) References Cited

U.S. PATENT DOCUMENTS

| | | | | |
|---|---|---|---|---|
| 5,363,260 | A * | 11/1994 | Kawakami | G11B 25/043 360/99.18 |
| 9,330,728 | B1 | 5/2016 | Nakamura et al. | |
| 9,336,817 | B1 * | 5/2016 | Hirasawa | G11B 25/043 |
| 2011/0255191 | A1 * | 10/2011 | Watanabe et al. | G11B 25/043 360/99.08 |
| 2012/0275055 | A1 * | 11/2012 | McGuire, Jr. | G11B 33/022 360/99.16 |

FOREIGN PATENT DOCUMENTS

| | | | |
|---|---|---|---|
| JP | 2016170843 | 9/2016 | |
| WO | WO-2023042866 A1 * | 3/2023 | G11B 33/02 |

* cited by examiner

*Primary Examiner* — Craig A. Renner
(74) *Attorney, Agent, or Firm* — JCIPRNET

(57) ABSTRACT

A base plate is a portion of a housing of a disk driving device having a disk rotating with a rotation axis as a center, and is a cast product. The base plate has a bottom plate part and a peripheral wall part. The bottom plate part has a rectangular shape when viewed in an axial direction. The peripheral wall part extends from an outer peripheral edge of the bottom plate part toward a side of the axial direction to surround the periphery of the bottom plate part. A metal member embedded in the peripheral wall part is provided.

12 Claims, 5 Drawing Sheets

BASE PLATE WITH METAL MEMBER EMBEDDED IN THE PERIPHERAL WALL PART, MOTOR, AND DISK DRIVING DEVICE HAVING THE SAME

CROSS REFERENCE TO RELATED APPLICATIONS

The present invention claims priority under 35 U.S.C. § 119 to Japanese Application No. 2022-143764 filed on Sep. 9, 2022 the entire content of which is incorporated herein by reference.

FIELD OF THE INVENTION

The disclosure relates to a base plate, a motor, a disk driving device, and a manufacturing method of the base plate.

BACKGROUND

Conventionally, a base plate forming a portion of a housing of a disk driving device is a cast product, and has a bottom plate part having a rectangular shape when viewed in the axial direction and a peripheral wall part. The peripheral wall part extends from an outer peripheral edge of the bottom plate part toward a side of the axial direction to surround the periphery of the bottom plate part.

However, in the conventional base plate, when the peripheral wall part is thickened in the radial direction to increase the strength, a blow hole may occur easily. Therefore, the helium gas filled in the housing may leak to the outside through the blow hole.

SUMMARY

A base plate according to an exemplary embodiment of the disclosure is a portion of a housing of a disk driving device having a disk rotating with a rotation axis as a center, and is a cast product. The base plate has a bottom plate part and a peripheral wall part. The bottom plate part has a rectangular shape when viewed in an axial direction. The peripheral wall part extends from an outer peripheral edge of the bottom plate part toward a side of the axial direction to surround the periphery of the bottom plate part. A metal member embedded in the peripheral wall part is provided.

A manufacturing method of a base plate according to an exemplary embodiment of the disclosure is a manufacturing method of a base plate as a portion of a housing of a disk driving device having a disk rotating with a rotation axis as a center and includes a casting process. In the casting process, a bottom plate part and a peripheral wall part are cast integrally by using a mold. The bottom plate part has a rectangular shape when viewed in an axial direction. The peripheral wall part extends from an outer peripheral edge of the bottom plate part toward a side of the axial direction and surrounds a periphery of the bottom plate part. In the casting process, the metal member is embedded in a portion of the peripheral wall part through insert molding.

The above and other elements, features, steps, characteristics and advantages of the present disclosure will become more apparent from the following detailed description of the preferred embodiments with reference to the attached drawings.

DETAILED DESCRIPTION

An exemplary embodiment of the disclosure is described in detail with reference to the drawings. In the specification, a direction parallel to a rotation axis C of a disk 50 is referred to as "axial direction", a direction orthogonal to the rotation axis C is referred to as "radial direction", and a direction along an arc with the rotation axis C as the center is referred to as "circumferential direction". In the application, the axial direction is arranged as the upper-lower direction, the side of a cover 42 with respect to a base plate 41 is referred to as "top" to describe the shapes and positional relationships among the respective components. However, such definition of the upper-lower direction is not intended to define the orientation when the base plate 41 and a disk driving device 1 according to the disclosure are used.

Figure 1:
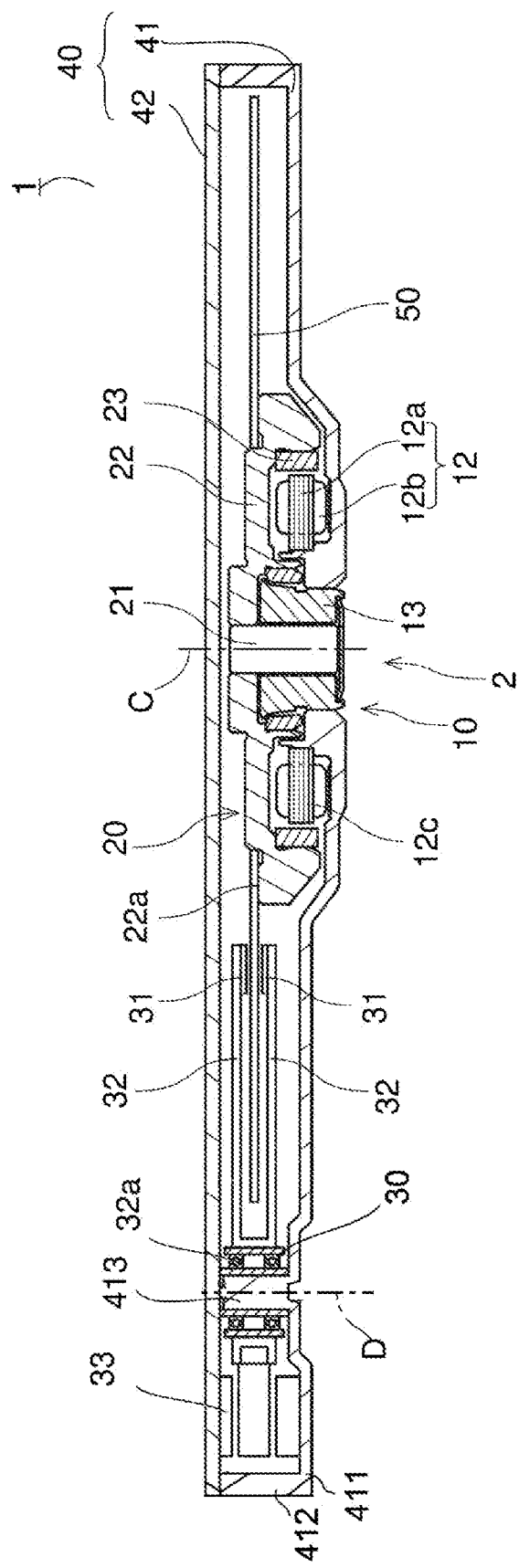
FIG. 1 is a longitudinal cross-sectional view illustrating a disk driving device according to an embodiment of the disclosure.

The disk driving device 1 according to an exemplary embodiment of the disclosure is described. FIG. 1 is a longitudinal cross-sectional view illustrating the disk driving device 1 according to an embodiment of the disclosure.

The disk driving device 1 is a hard disk drive. The disk driving device 1 includes a spindle motor (motor) 2, a disk 50, a head 31, an arm 32, a swing mechanism 33, and a housing 40.

The housing 40 accommodates the spindle motor 2, the disk 50, the head 31, the arm 32, and the swing mechanism 33 therein.

The interior of the housing 40 is filled with gas with a density lower than air. Specifically, helium gas is filled therein. In place of the helium gas, hydrogen gas, etc., may also be filled therein.

The housing 40 is formed by casting a die-cast material (cast member) formed by metal, such as aluminum alloy. As the die-cast material, metallic materials other than aluminum alloy may also be used.

The housing 40 includes the base plate 41 and the cover 42. The disk 50, the spindle motor 2, and an access part 30 are disposed on the base plate 41 inside the housing 40. The opening of the upper part of the base plate 41 is blocked by the cover 42. Details of the base plate 41 will be described afterwards.

The spindle motor 2 rotates the disk 50 with the rotation axis C as the center while supporting the disk 50. That is, the disk 50 is rotated with the rotation axis C as the center by using the spindle motor 2. The spindle motor 2 has a stationary part 10 and a rotation part 20. The stationary part 10 is stationary with respect to the housing 40. The rotation part 20 is supported to be rotatable with respect to the stationary part 10.

The stationary part 10 has a stator 12 and a bearing unit 13. In addition, a portion of the base plate 41 forms the stationary part 10. That is, the spindle motor 2 includes the base plate 41. The base plate 41 expands vertically with respect to the rotation axis C on the lower side of the rotation part 20. The base plate 41 is a portion of the spindle motor 2 and also a portion of the housing 40. The stator 12 and the bearing unit 13 are fixed to the base plate 41.

The stator 12 has a stator core 12a that is a magnetic body and multiple coils 12b. The stator core 12a has multiple teeth 12c protruding radially outward. The coils 12b are formed by conductive wires wound on the teeth 12c.

The bearing unit 13 supports a shaft 21 on the side of the rotation part 20 to be rotatable. As an example, a fluid dynamic pressure bearing mechanism is used for the bearing unit 13.

The rotation part 20 has the shaft 21, a hub 22, and a magnet 23. The shaft 21 is a column-like member extending in the axial direction. The lower end of the shaft 21 is accommodated inside the bearing unit 13.

The hub 22 is fixed to the upper end of the shaft 21 and expands radially outward. The upper surface of an outer peripheral part 22a of the hub 22 supports the disk 50. The magnet 23 is fixed to the inner peripheral surface of the hub 22, and is disposed to be separated by a predetermined distance to face the radially outer side of the stator 12. The magnet 23 has a ring shape, and the inner peripheral surface of the magnet 23 is alternately magnetized with N poles and S poles in the circumferential direction.

When the driving current is supplied to the coils 12b, a magnetic flux is generated in the teeth 12c. In addition, due to the interaction of the magnetic flux between the teeth 12c and the magnet 23, a torque in the circumferential direction is generated. As a result, the rotation part 20 rotates, with the rotation axis C as the center, with respect to the stationary part 10. The disk 50 supported by the hub 22 rotates together with the rotation part 20 with the rotation axis C as the center.

The disk 50 is a disk-shaped information recording medium having a hole at the central part. The respective disks 50 are mounted to the spindle motor 2 and are disposed to be parallel and equidistant to each other in the axial direction via a spacer (not shown).

The head 31 magnetically performs information reading and writing with respect to the disk 50. The arm 32 is installed to the tip end part of a pivot post 413 of the base plate 41 to be described afterwards via a bearing 32a. The head 31 is provided at the tip end part of the arm 32.

The swing mechanism 33 is a mechanism for swinging the arm 32 and the head 31. When the swing mechanism 33 is driven, the arm 32 swings with a swing axis D as the center. That is, the head 31 swings with the swing axis D as the center by using the swing mechanism 33 via the arm 32. At this time, the head 31 moves relatively with respect to the disk 50 and closely accesses the rotating disk 50. In the embodiment, although a rotating axis structure is described as an example of a bearing structure, the bearing structure may also be a fixed axis structure.

Figure 2:
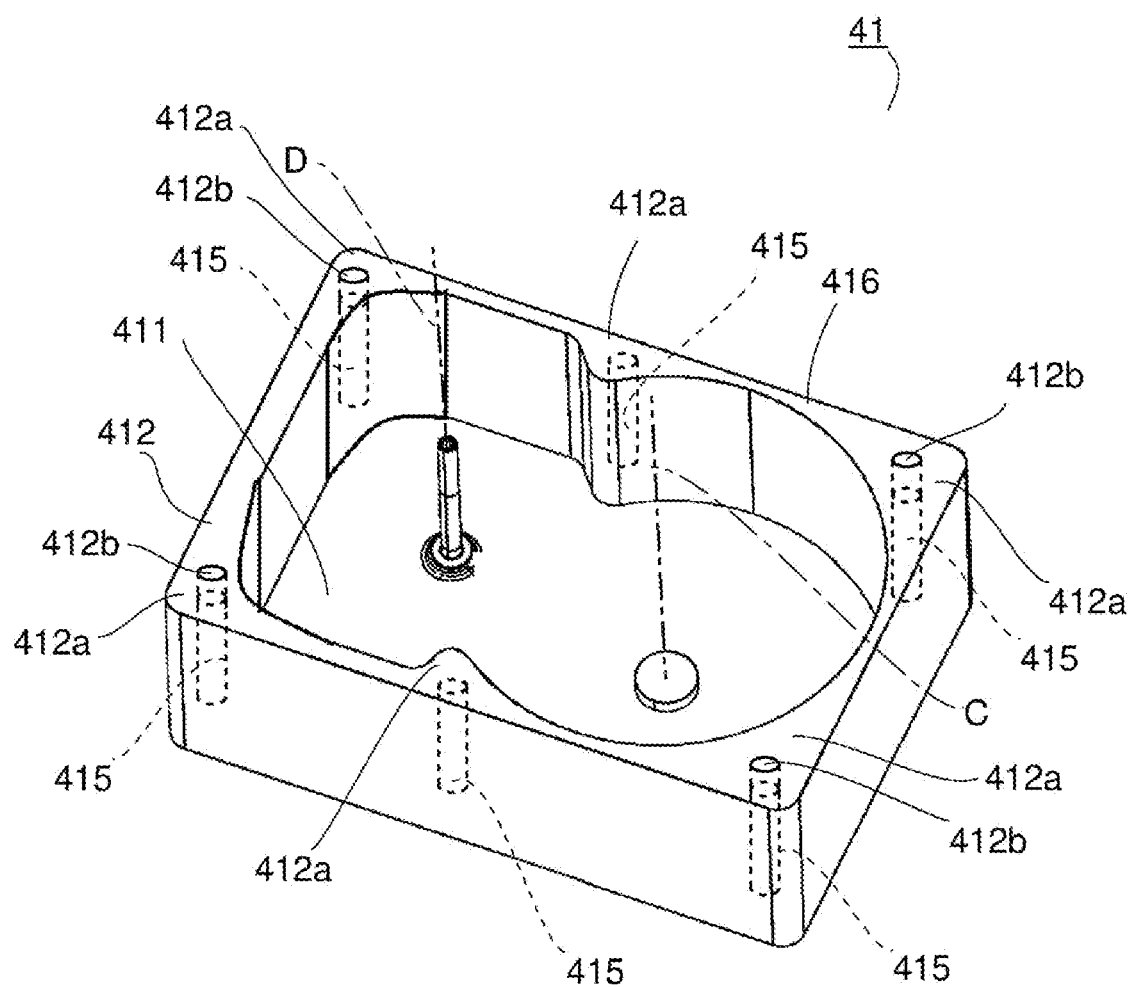
FIG. 2 is a schematic perspective view illustrating a base plate according to the embodiment of the disclosure.
Figure 3:
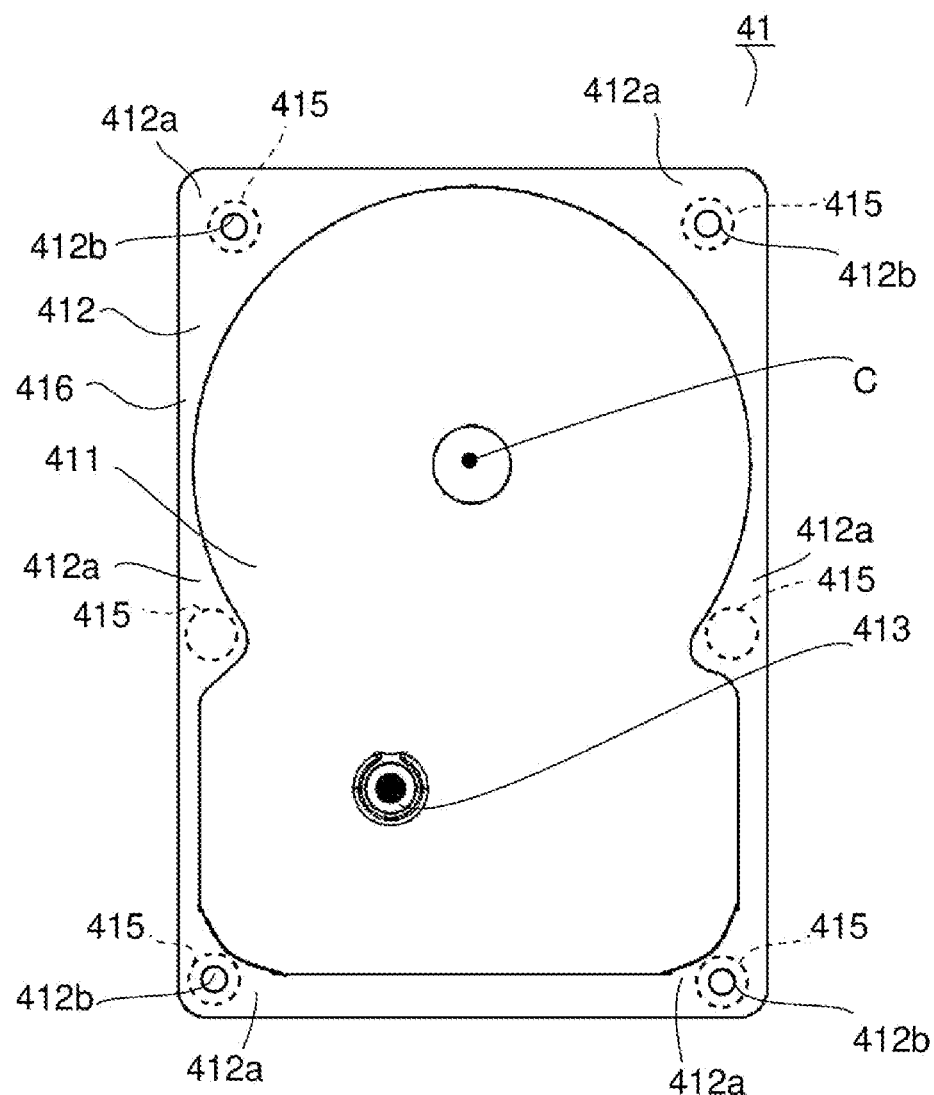
FIG. 3 is a schematic top view illustrating the base plate according to the embodiment of the disclosure.
Figure 4:
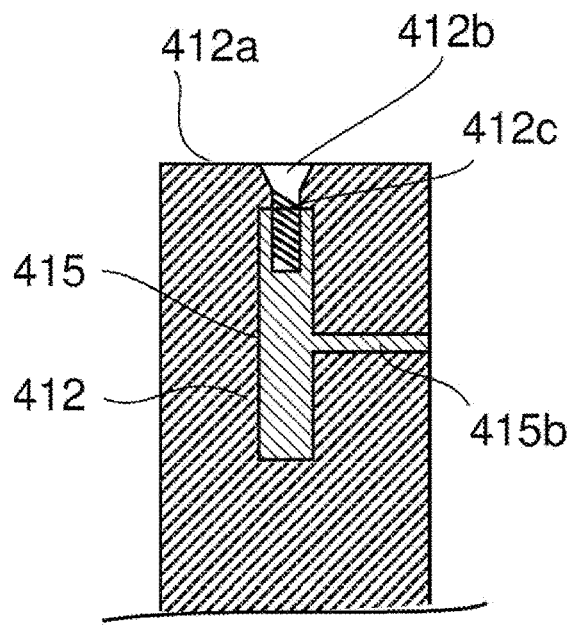
FIG. 4 is a schematic longitudinal cross-sectional view illustrating a portion of the base plate according to the embodiment of the disclosure.

FIG. 2 is a schematic perspective view illustrating the base plate 41, and FIG. 3 is a schematic top view illustrating the base plate 41. FIG. 4 is a schematic longitudinal cross-sectional view illustrating a peripheral wall part 412 of the base plate 41.

The base plate 41 is a portion of the housing 40 of the disk driving device 1 having the disk 50 rotating with the rotation axis C as the center, and is a cast product. The base plate 41 is formed in a box shape with the upper surface being open.

The base plate 41 has a bottom plate part 411, the peripheral wall part 412, and the pivot post 413. The bottom wall part 411 and the peripheral wall part 412 are cast integrally. The bottom plate part 411 is in a rectangular shape when viewed in the axial direction, and expands vertically with respect to the rotation axis C. The spindle motor 2 and the access part are supported by the bottom plate part 411. The pivot post 413 protrudes upward from the upper surface of the bottom plate 411 along the swing axis D, and is formed in a cylindrically columnar shape.

The peripheral wall part 412 extends from an outer peripheral edge of the bottom plate part 411 toward the axially upper side (a side of the axial direction) to surround the periphery of the bottom plate part 411. The cover 42 is screwed to the upper end surface (end surface on the axially upper side) of the peripheral wall part 412. The peripheral wall part 412 includes a thin part 416 having a small thickness in the radial direction, and multiple thick parts 412a having a thickness in the radial direction greater than the thin part 416. Accordingly, the thickness of the thick parts 412a in the radial direction is greater than the thicknesses of other portions of the peripheral wall part 412. When viewed in the axial direction, the thick parts 412a are respectively formed on the corner parts and the long sides of the peripheral wall part 412. By forming the thick parts 412a, the peripheral wall part 412 can be strengthened. In addition, by forming multiple thick parts 412a, the cover 42 is stably supported with respect to the thick parts 412a. Accordingly, the cover 42 screwed to the thick parts 412a can be prevented from being inclined with respect to the base plate 41 and can be fixed firmly.

In the embodiment, the thick parts 412a are formed at a total of six positions, which are the respective corner parts at four positions of the peripheral wall part 412 and one position on each long side of the peripheral wall part 412. However, the thick parts 412a may also be formed at at least one position of the corner parts of the peripheral wall part 412 or at least one position on the long sides of the peripheral wall part 412.

At the time when the base plate 41 is being cast, metal members 415 are inserted into the thick parts 412a, and the metal members 415 are embedded in portions of the peripheral wall part 412. The metal members 415 are formed by components different from the cast member forming the peripheral wall part 412.

The metal member 415 may be formed by the same metal as the cast member forming the peripheral wall part 412, such as being formed by aluminum alloy. Accordingly, the arrangement tightness between the metal member 415 and the cast member forming the peripheral wall part 412 is increased.

The metal member 415 is formed in a cylindrically columnar shape through cutting, forging, or casting, for example. The metal member 415 is not limited to the cylindrically columnar shape, but may also be formed in various shapes in accordance with the shape of the base plate 41. The metal member 415 is smaller than the base plate 41, and even if the metal member 415 is formed by casting, a blow hole hardly occurs in the metal member 415 itself.

By forming a portion of the peripheral wall part 412 by using the metal member 415, the cast member covering the periphery of the metal member 415 can be thinned. Accordingly, the occurrence of blow holes in the peripheral wall part 412 can be decreased. Consequently, the leakage of the helium gas filled in the housing 40 to the outside via blow holes can be reduced.

At this time, even if the cast region of the peripheral wall part 412 is thinned, the overall strength of the peripheral wall part 412 can be prevented from decreasing due to the strength of the metal member 415 itself. Accordingly, the base plate 41 capable of reducing the leakage of the gas filled in the housing 40 while suppressing the decrease in strength of the peripheral wall part 412 can be provided.

The metal member 415 is insert-molded with the peripheral wall part 412, and the metal member 415 is formed by the same metal as the cast member forming the peripheral wall part 412. Accordingly, the metal member 415 is tightly arranged with the cast member, and the helium gas filled in the housing 40 can be prevented from leaking to the outside from the bonding surface between the cast member and the metal member 415.

In the embodiment, one metal member 415 is provided at each thick part 412a of the peripheral wall part 412. Accordingly, the occurrence of blow holes in each thick part 412a can be decreased while the decrease of the strength of the thick part 412a can be suppressed.

In the embodiment, it may also be that multiple metal members 415 are disposed in each thick part 412a. Accordingly, multiple metal members 415 can be arranged in accordance with the shape of each thick part 412a. Accordingly, the occurrence of blow holes in each thick part 412a can be decreased.

Screw holes 412b are formed in the thick parts 412 at four positions disposed at the corner parts of the peripheral wall part 412. The screw hole 412b extends in the axial direction from the upper end surface (end surface on a side) of the peripheral wall part 412 on the thick part 412a. In the embodiment, the screw hole 412b extends continuously in the axial direction through the cast member and the metal member 415 (see FIG. 4). In the screw hole 412b, an engagement part 412c is formed in the cast member and the metal member 415. That is, at least a portion of the engagement part 412c of the screw hole 412b is overlapped with the metal member 415. The cover 42 covering the opening of the peripheral wall part 412 is screwed to the peripheral wall part 412 via the screw hole 412b.

The engagement part 412c is a female screw formed by performing tap processing on the screw hole 412b. At the time of performing tap processing to form the female screw part in the screw hole 412b, fine blow holes on the periphery of the screw holes 412b can be prevented from being in communication with the screw hole 412b. In the metal member 415, blow holes are less likely to occur on the periphery of the engagement part 412c. Accordingly, the leakage of the gas filled into the housing 40 via the screw hole 412b can be reduced.

In the thick part 412a, the radial thickness of the cast member forming the peripheral wall part 412 may be 1.0 mm or more. By setting the radial thickness of the cast member to be 1.0 mm or more, the metal member 415 that is greater in the radial direction can be disposed in the thick part 412a. Accordingly, the peripheral wall part 412 can be strengthened, while the occurrence of blow holes can be suppressed.

The metal member 415 has a branch part 415b protruding radially outward. The branch part 415b is formed at the time of release after the base plate 41 is cast by using a mold. Details of the branch part 415b will be described afterwards. With the branch part 415b, a portion of the metal member 415 is exposed to the outside of the peripheral wall part 412. Accordingly, at the time of assembling the disk driving device 1, by visually observing the metal member 415 that is exposed, it can be confirmed that the metal member 415 is included in a portion of the peripheral wall part 412.

Figure 5:
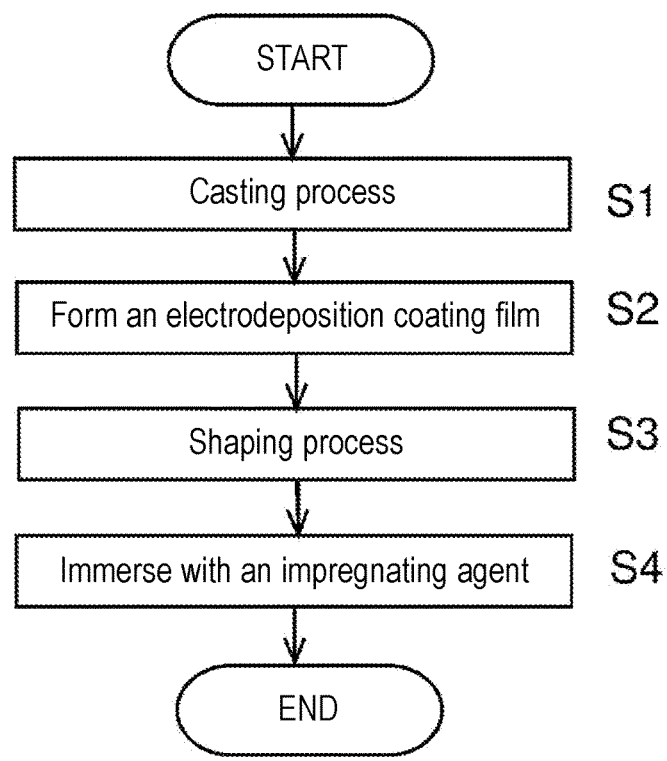
FIG. 5 is a flowchart illustrating a process of manufacturing the base plate according to the embodiment.

FIG. 5 is a flowchart illustrating a process of manufacturing the base plate 41 according to the embodiment. A method of manufacturing the base plate 41 of a cast product forming a portion of the housing 40 of the disk driving device 1 includes a casting process. In the casting process of Step S1, melt metal flows into a mold, and the bottom plate part 411 and the peripheral wall part 412 are integrally cast by using a mold. At this time, the metal member 415 formed by a different component from the cast member forming the peripheral wall part 412 in a portion of the peripheral wall part 412 is embedded in the portion of the peripheral wall part 412 through insert molding. The melt metal, for example, is melt aluminum alloy.

At this time, the metal member 415 can be formed in advance through cutting, forging, or casting. In the case where the metal member 415 is formed by casting, the metal member 415 is smaller than the base plate, and can prevent blow holes from occurring in the metal member 415 itself.

By inserting and casting the metal member 415 into a portion of the peripheral wall part 412, the region formed by the cast member can be thinned, while the decrease in the strength of the peripheral wall 412 can be suppressed. Accordingly, the occurrence of blow holes in the peripheral wall part 412 can be decreased. In addition, by inserting and casting the metal member 415, a portion of the peripheral wall part 412 can be easily formed by the metal member 415.

After having spread into the mold, the melt metal is cooled and cured. Accordingly, a chill layer (not shown) is formed on the surfaces of the bottom plate part 411 and the peripheral wall part 412. In the chill layer in which the melt metal is cured earlier than other portions, the impurities are fewer, and the metal density is higher.

After the base plate 41 is released from the mold, cured portions collected in an air vent channel (not shown) in the mold are cut off.

The metal member 415 has the branch part 415b protruding radially outward, and the branch part 415b is fixed to the mold before the melt metal flows in. At the time when the peripheral wall part 412 is released from the mold, the branch part 415b protrudes radially outward with respect to the outer peripheral surface of the peripheral wall part 412. After the release from the mold, the portion of the branch part 415b protruding radially outward with respect to the outer peripheral surface of the peripheral wall part 412 is cut off (see FIG. 4).

In Step S2, an electrodeposition coating film (not shown) is formed on the surface of the base plate 41 released from the mold. For example, the base plate 41 is immersed into an epoxy resin coating material. Then, currents respectively flow between the coating material and the base plate 41. Accordingly, the coating material is attached to the surface of the base plate 41, and the electrodeposition coating film is formed.

In Step S3, the pivot post 413, which requires accuracy, on the surface of the base plate 41 is shaped by performing precision machining through cutting. At this time, by performing cutting on the surface of the base plate 41, the electrodeposition coating film (not shown) is also cut off. Accordingly, a region without the electrodeposition coating film is formed on the surface of the base plate 41.

In Step S4, the base plate 41 is immersed into an impregnating agent. At this time, the impregnating agent is infiltrated on the machined surface where the electrodeposition coating film is cut off. For the impregnating agent, for example, epoxy resin or acrylic resin is used. Accordingly, the helium gas filled in the housing 40 is prevented from leaking to the outside via the machined surface.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

Figure 6:
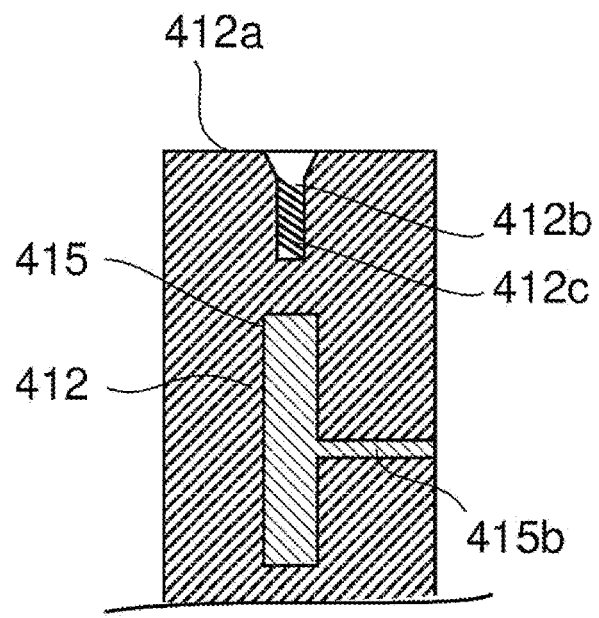
FIG. 6 is a schematic longitudinal cross-sectional view illustrating a portion of a modified example of the base plate according to the embodiment of the disclosure.
Figure 7:
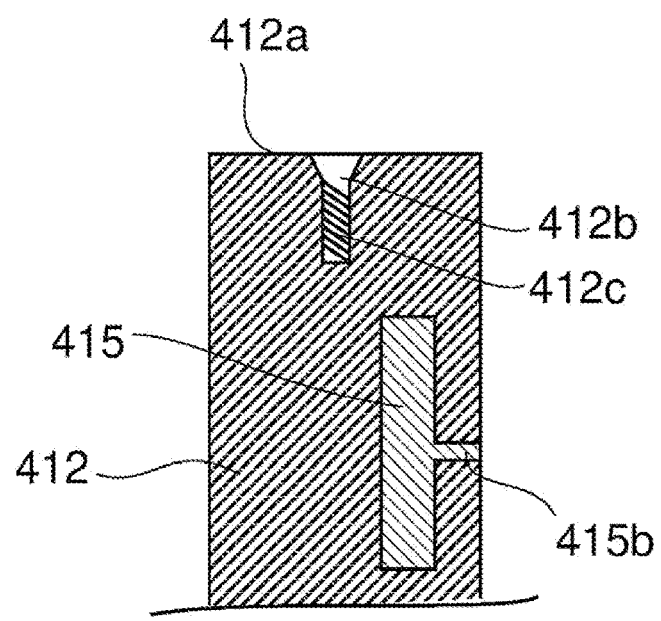
FIG. 7 is a schematic longitudinal cross-sectional view illustrating a portion of a modified example of the base plate according to the embodiment of the disclosure.

For example, the metal member 415 may also be formed by a material different from the material of the cast member forming the peripheral wall part 412. In addition, FIGS. 6 and 7 are schematic longitudinal cross-sectional view illustrating a portion of modified examples of the base plate. As shown in FIGS. 6 and 7, it may also be that the engagement part of the screw hole 412b is not overlapped with the metal member 415. At this time, it is not required to form the screw hole and the engagement part 412c in the metal member 415. In addition, as shown in FIG. 7, when viewed in the axial direction, the screw hole 412b and the metal member 415 may be deviated in the radial direction.

According to the above, a base plate (40) according to an aspect of the disclosure is a portion of a housing (40) of a disk driving device (1) having a disk (50) rotating with a rotation axis (C) as a center, and is a cast product. The base plate has: a bottom plate part (411), having a rectangular shape when viewed in an axial direction; and a peripheral wall part (412), extending from an outer peripheral edge of the bottom plate part toward a side of the axial direction and surrounding a periphery of the bottom plate part, and a metal member (415) embedded in the peripheral wall part is provided (first configuration).

In the first configuration, it may also be configured that the peripheral wall part has a thin part (416) having a small thickness in a radial direction and a thick part (412a) having a thickness in the radial direction greater than the thin part, and multiple metal members are disposed in each thick part (second configuration).

In the second configuration, it may also be configured that when viewed in the axial direction, the thick part is formed at at least one position of a corner part of the peripheral wall part (third configuration).

In the second configuration, it may also be configured that when viewed in the axial direction, the thick part is formed at at least one position on a long side of the peripheral wall part (fourth configuration).

In any of the second to fourth configurations, it may also be configured that multiple metal members are disposed in each thick part (fifth configuration).

In any of the second to fifth configurations, it may also be configured that in the thick part, a radial thickness of a cast member forming the peripheral wall part is 1.0 mm or more (sixth configuration).

In any of the first to sixth configurations, it may also be configured that the metal member and a cast member forming the peripheral wall part are formed from a same metal (seventh configuration).

In any of the first to seventh configurations, it may also be configured that wherein a portion of the metal member is exposed to an outside of the peripheral wall part (eighth configuration).

In any of the first to eighth configurations, it may also be configured that wherein a screw hole (412b) extending in the axial direction from an end surface on a side of the peripheral wall part is formed on the thick part (ninth configuration).

In the ninth configuration, it may also be configured that at least a portion of an engagement part of the screw hole is overlapped with the metal member (tenth configuration).

In any of the first to tenth configurations, it may also be configured that the metal member is insert-molded with the peripheral wall part (eleventh configuration).

A motor (2) according to another aspect of the disclosure includes: the base plate according to any one of the first to eleventh configurations; a stator (12), fixed to the base plate; and a rotor, facing the stator in a radial direction, and rotating with the rotation axis as a center (twelfth configuration).

A hard disk device (1) according to yet another aspect of the disclosure includes: the motor according to the twelfth configuration; a disk (50), rotated, with the rotation axis as a center, by the motor; and a head, performing at least one of reading and writing of information with respect to the disk (thirteenth configuration).

A manufacturing method of a base plate (41) as a portion of a housing (40) of a disk driving device (1) having a disk (50) rotating with a rotation axis as a center according to still another aspect of the disclosure includes: a casting process of integrally casting, by using a mold, a bottom plate part (411) and a peripheral wall part (412), the bottom plate part having a rectangular shape when viewed in an axial direction, and the peripheral wall part extending from an outer peripheral edge of the bottom plate part toward a side of the axial direction and surrounding a periphery of the bottom plate part. In the casting process, the metal member is embedded in a portion of the peripheral wall part through insert molding (fourteenth configuration).

In the fourteenth configuration, it may also be configured that the metal member is formed in advance through cutting, forging, or casting (fifteenth configuration).

The disclosure, for example, can be used for a housing used in a disk drive device such as a hard disk drive.

What is claimed is:

1. A base plate, being a portion of a housing of a disk driving device having a disk rotating with a rotation axis as a center, the base plate being a cast product, wherein the base plate has:
    a bottom plate part, having a rectangular shape when viewed in an axial direction; and
    a peripheral wall part, extending from an outer peripheral edge of the bottom plate part toward a side of the axial direction and surrounding a periphery of the bottom plate part,
    wherein a metal member embedded in the peripheral wall part is provided, and a peripheral of the metal member is covered by the peripheral wall part, and
    wherein the metal member has a branch part protruding radially outward, and the branch part is exposed to an outside of the peripheral wall part at an exposed portion, a first length of the exposed portion in the axial direction is smaller than a second length of the metal member in the axial direction.

2. The base plate as claimed in claim 1, wherein the peripheral wall part has a thin part having a small thickness in a radial direction and a thick part having a thickness in the radial direction greater than the thin part, and
    the metal member is disposed in the thick part.

3. The base plate as claimed in claim 2, wherein, when viewed in the axial direction, the thick part is formed at at least one position of a corner part of the peripheral wall part.

4. The base plate as claimed in claim 2, wherein, when viewed in the axial direction, the thick part is formed at at least one position on a long side of the peripheral wall part.

5. The base plate as claimed in claim 3, wherein a plurality of metal members are disposed in each thick part.

6. The base plate as claimed in claim 2, wherein, in the thick part, a radial thickness of a cast member forming the peripheral wall part is 1.0 mm or more.

7. The base plate as claimed in claim 1, wherein the metal member and a cast member forming the peripheral wall part are formed from a same metal.

8. The base plate as claimed in claim 2, wherein a screw hole extending in the axial direction from an end surface on a side of the peripheral wall part is formed on the thick part.

9. The base plate as claimed in claim 8, wherein at least a portion of an engagement part of the screw hole is overlapped with the metal member.

10. The base plate as claimed in claim 1, wherein the metal member is insert-molded with the peripheral wall part.

11. A motor, comprising:
the base plate as claimed in claim 1;
a stator, fixed to the base plate; and
a rotor, facing the stator in a radial direction, and rotating with the rotation axis as a center.

12. A disk driving device, comprising:
the motor as claimed in claim 11;
a disk rotated, with the rotation axis as a center, by the motor; and
a head, performing at least one of reading and writing of information with respect to the disk.

* * * * *